United States Patent [19]
Veenhof

[11] Patent Number: 5,647,476
[45] Date of Patent: Jul. 15, 1997

[54] CONVEYOR BELT SCRAPER BLADE

[75] Inventor: Willem D. Veenhof, El Cajon, Calif.

[73] Assignee: Martin Engineering Company, Neponset, Ill.

[21] Appl. No.: 430,394

[22] Filed: Apr. 28, 1995

Related U.S. Application Data

[63] Continuation-in-part of Ser. No. 269,568, Jul. 1, 1994, Pat. No. 5,413,208.

[51] Int. Cl.$^6$ ............................................. B65G 45/12
[52] U.S. Cl. ........................................ 198/497; 198/499
[58] Field of Search ................................. 198/497, 499; 15/256.5

[56] References Cited

U.S. PATENT DOCUMENTS

| | | |
|---|---|---|
| 4,533,036 | 8/1985 | Gordon . |
| 4,633,999 | 1/1987 | Perneczky ............................. 198/499 |
| 4,643,293 | 2/1987 | Swinderman . |
| 4,658,949 | 4/1987 | Reicks . |
| 4,787,500 | 11/1988 | Holz . |
| 4,850,474 | 7/1989 | Schwarze ............................. 198/499 |
| 4,917,231 | 4/1990 | Swinderman . |
| 4,953,689 | 9/1990 | Peterson et al. ..................... 198/497 |
| 5,197,587 | 3/1993 | Malmberg . |
| 5,222,588 | 6/1993 | Gordon . |
| 5,222,589 | 6/1993 | Gordon . |
| 5,310,042 | 5/1994 | Veenhof . |
| 5,339,947 | 8/1994 | Campanile ........................... 198/499 |
| 5,373,931 | 12/1994 | Barnes et al. ....................... 198/499 |
| 5,518,107 | 5/1996 | Schwarze ............................ 198/499 |

FOREIGN PATENT DOCUMENTS

| | | | |
|---|---|---|---|
| 1433912 | 2/1966 | France ............................... 198/499 |
| 1234-315-A | 5/1986 | U.S.S.R. . |
| 2 267 072 A | 11/1993 | United Kingdom . |

*Primary Examiner*—Karen B. Merritt
*Assistant Examiner*—Douglas Hess
*Attorney, Agent, or Firm*—Lee, Mann, Smith, McWilliams, Sweeney & Ohlson

[57] ABSTRACT

A conveyor belt scraper blade adapted for use in cleaning the surface of a conveyor belt. The scraper blade includes a resilient arm member extending between a lower base portion and an upper end portion. The arm member is adapted to pivot about an axis extending through the base portion. A scraping block is attached to the upper end portion of the arm member. The scraping block includes a front surface and a rear surface. The front surface extends between an upper scraping edge adapted to contact the surface of the conveyor belt and a spaced apart lower edge. The front surface is adapted to form an obtuse scraping angle with the surface of the conveyor belt. A restraining member extends substantially from the scraping edge to the arm member. The restraining member substantially prevents movement of the scraping edge with respect to the front surface and controls the amplitude of vibration of the scraper blade during use.

18 Claims, 2 Drawing Sheets

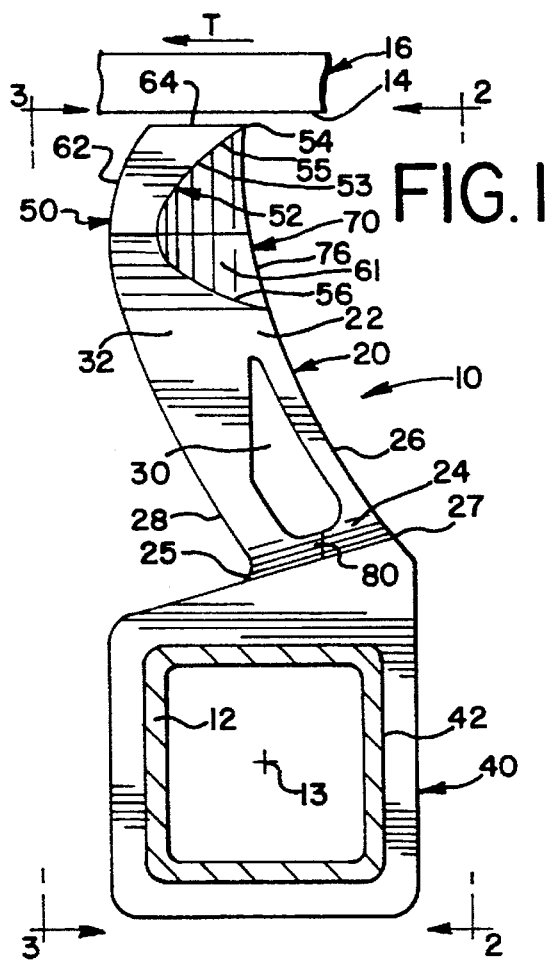
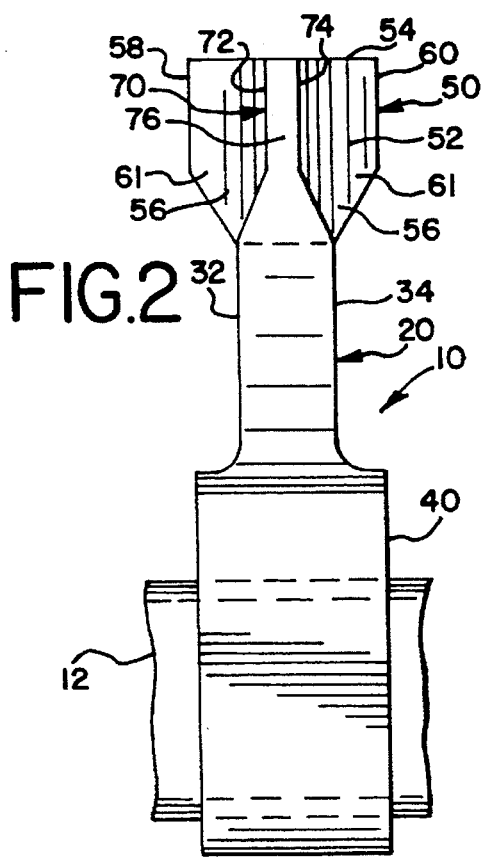
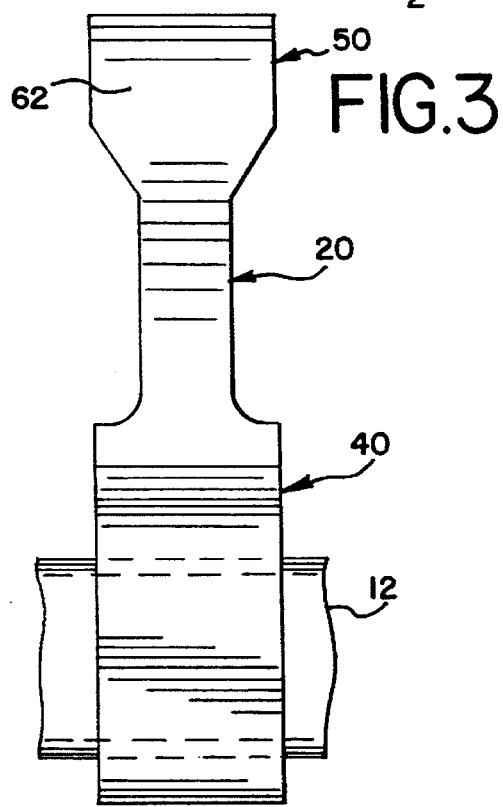
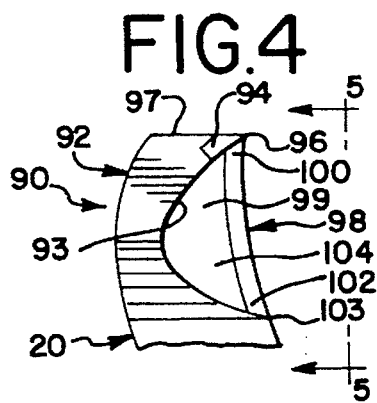
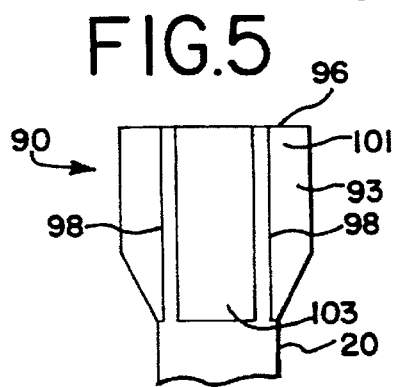

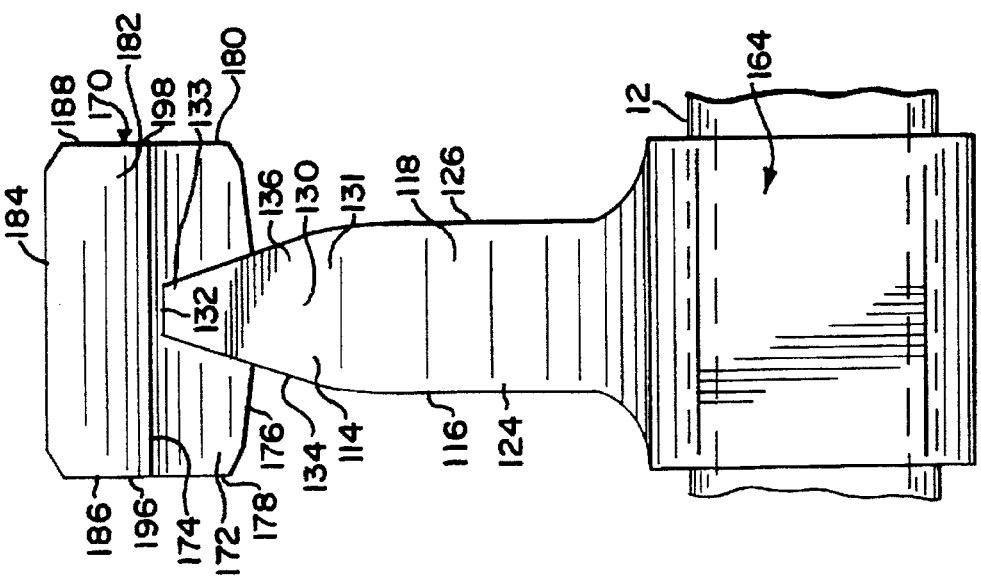
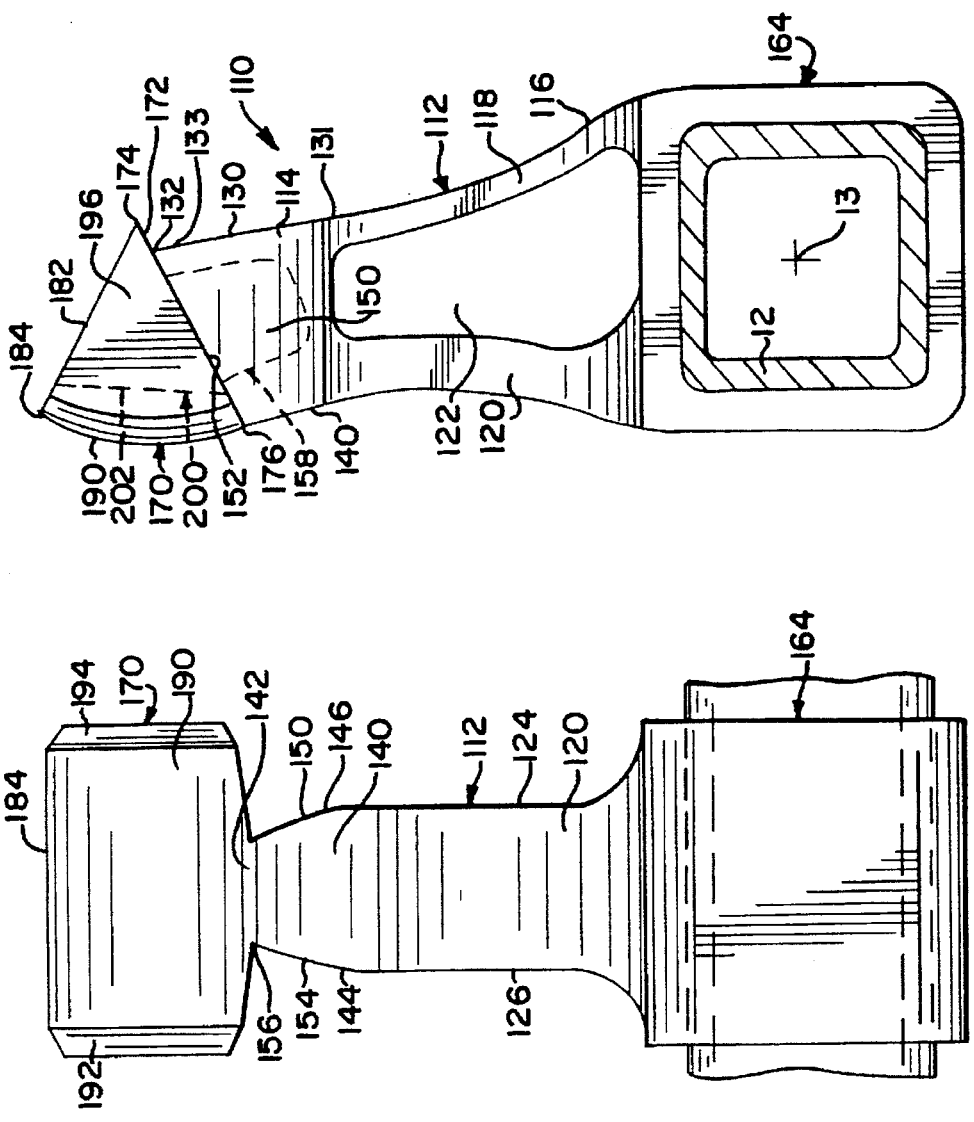

CONVEYOR BELT SCRAPER BLADE

RELATED APPLICATIONS

This is a continuation-in-part of U.S. patent application Ser. No. 08/269,568, filed Jul. 1, 1994, now U.S. Pat. No. 5,413,208.

BACKGROUND OF THE INVENTION

The present invention is directed to a scraper blade for use in a conveyor belt cleaner mechanism for the removal of adherent material from a conveyor belt, and in particular, to a scraper blade which includes a structure adapted to control or eliminate the amplitude of vibration of the scraper blade during use when the face of the blade is located at a right angle or an obtuse cleaning angle relative to the conveyor belt.

Scraper blades are used in conveyor belt cleaning mechanisms to remove material which adheres to the belt surface after the material has passed the material discharge point of the conveyor. The cleaning angle of a scraper blade, which is the angle between the surface of the conveyor belt and the face of the scraper blade which faces the oncoming belt, may be an acute angle of less than 90°, a right angle of 90°, or an obtuse angle of greater than 90°. As used hereinafter, "obtuse angle" shall include a right angle of 90°.

Scraper blades that operate at an acute cleaning angle tend to trap material between the belt surface and the scraper blade as the direction of movement of the adherent material must change by greater than 90° during removal. This action is often referred to as "scraping". A scraper blade operating at an acute cleaning angle may also separate from the belt surface due to an accumulation of trapped material between the blade and the conveyor belt, a condition known as "planing."

A scraper blade that operates at an obtuse cleaning angle is more efficient in removing adherent material from the belt as adherent material does not become trapped between the blade and the belt and as adherent material can be removed with a smaller change in the direction of travel of the adherent material than with a scraper blade having an acute cleaning angle. This action is often referred to as "peeling".

While an obtuse cleaning angle is preferable over an acute cleaning angle, and a resiliently mounted blade is preferable to a rigidly mounted blade, resiliently mounted scraper blades having an obtuse cleaning angle are subject to destructive and cleaning efficiency reducing vibration at the scraping edge of the scraper blade. When a scraper blade is engaged against the belt surface, a rotational moment is created in the scraper blade by the drag of the belt over the edge of the scraper blade. When pressed against a conveyor belt, with a predetermined force to generate a predetermined cleaning pressure, a resiliently mounted scraper blade having an acute cleaning angle will rotate in a direction away from the belt surface, thus reducing the drag force created by the belt. This results in a comparatively small rotation and consequently only a small change in orientation from the scraper blade's natural orientation, thus producing a relatively stable and constant relationship between the blade and the belt surface with little or no resulting scraper blade vibration.

A resiliently mounted scraper blade having an obtuse cleaning angle, and applied against the belt with the same predetermined cleaning pressure will rotate in a direction toward the belt surface, causing a reaction in the blade supporting mechanism which moves in a direction away from the belt surface thereby reducing the drag force, which immediately causes the resiliently mounted blade to snap back to its natural orientation allowing the blade support mechanism to rotate towards the belt surface and resume the predetermined cleaning pressure which causes the same cycle of action and reaction to begin all over again. This unstable fluctuating relationship between the blade and the belt surface is seen as vibration of the scraping edge of the scraper blade relative to the belt surface, which is undesirable.

Scraper blades having an obtuse cleaning angle have previously been used as shown in U.S. Pat. No. 4,787,500. Ribs and other devices have been used to strengthen the base of a scraper blade, but such reinforcements control vibration of the scraping edge by increasing rigidity, thus reducing resiliency, and thereby increasing the risk of damage to the conveyor belt and the belt cleaning device.

SUMMARY OF THE INVENTION

A conveyor belt scraper blade is adapted for use in a conveyor belt cleaner for cleaning the surface of a conveyor belt. The scraper blade includes a resilient arm member extending transversely between a lower base portion and an upper end portion. The arm member is adapted to pivot about an axis extending through the base portion of the arm member. A scraping member is attached to the upper end portion of the arm member. The scraping member includes a front surface and an opposing rear surface. The front surface may form a generally arcuate chamber extending between an inlet end having an upper scraping edge adapted to contact the surface of the conveyor belt and a spaced apart lower surface portion forming an outlet end. The front surface is adapted to form an obtuse scraping angle with the surface of the conveyor belt. A restraining member extends substantially from the scraping edge at the inlet end of the chamber to the lower surface portion at the outlet end of the chamber. The restraining member substantially prevents separation of the scraping edge and inlet end from the outlet end and lower surface portion of the front surface beyond a predetermined distance and controls the amplitude of vibration of the scraper blade during use. Alternatively, the front surface may be generally planar such that it extends between a scraping edge and a rear edge with the restraining member attached to the front surface adjacent the scraping edge to control vibration.

DESCRIPTION OF THE DRAWINGS

FIG. 1 is a side elevational view of the scraper blade of the present invention shown mounted on a cross-shaft for engagement with a conveyor belt.

FIG. 2 is a front elevational view of the scraper blade taken along lines 2—2 of FIG. 1.

FIG. 3 is a rear elevational view of the scraper blade taken along lines 3—3 of FIG. 1.

FIG. 4 is a partial side elevational view of a modified embodiment of the scraper blade.

FIG. 5 is a front elevational view of the modified embodiment of the scraper blade taken along lines 5—5 of FIG. 4.

FIG. 6 is a side elevational view of another embodiment of the scraper blade of the present invention shown mounted on a cross-shaft for engagement with a conveyor belt.

FIG. 7 is a front elevational view of the embodiment of the scraper blade of FIG. 6.

FIG. 8 is a rear elevational view of the embodiment of the scraper blade of FIG. 6.

DESCRIPTION OF THE PREFERRED EMBODIMENTS

FIG. 1 shows one embodiment of the scraper blade 10 mounted on an elongate cross-shaft 12 having a longitudinal axis 13 for scraping engagement with the surface 14 of the return run of a conveyor belt 16. The conveyor belt 16 is shown spaced slightly apart from the scraper blade 10 in FIG. 1 for purposes of illustration, however, the scraper blade 10 would normally be in scraping engagement with the surface 14 of the conveyor belt 16 during operation. The conveyor belt 16 travels in a direction shown by the arrow T. The cross-shaft 12 is shown as a rectangular tubular member, however, other configurations of cross-shafts may be used as desired for supporting one or more scraper blades 10 as part of a conveyor belt cleaner mechanism.

The scraper blade 10 includes a resilient arm member 20 having an upper end portion 22 and a lower base portion 24. The base portion 24 extends between a lower rear edge 25 and a lower front edge 27. The arm member 20 includes a front wall 26 and a spaced apart and opposing rear wall 28. The rear wall 28 is relatively strong in compression while the front wall 26 is relatively weak in compression compared to the rear wall 28. An aperture 30 extends transversely through the arm member 20 between the walls 26 and 28 from a first side wall surface 32 to a second side wall surface 34. The aperture 30 may have various different configurations as desired such as round, rectangular, triangular and variations thereof. The construction of the arm member 20 may be as generally described in U.S. Pat. No. 5,310,042 which is assigned to Martin Engineering the applicant herein. While the arm member 20 of the preferred embodiment includes an aperture 30 as shown in FIG. 1, the arm member 20 may also be formed without the aperture 30, if desired. The arm member 20 is resilient and is preferably made of an elastomeric material such as urethane.

The scraper blade 10 includes a mounting base 40 which is attached to the lower base portion 24 of the arm member 20. The mounting base 40 is shown in FIG. 1 as being generally rectangular with a rectangular aperture 42 extending transversely therethrough. The rectangular aperture 42 is adapted to fit closely around the rectangular cross-shaft 12 such that the mounting base 40 may slide longitudinally along the cross-shaft 12 but cannot rotate relative to the cross-shaft 12 about the longitudinal axis 13. Many other types of mounting arrangements other than the mounting base 40 shown in FIG. 1 may be used, as desired, to mount the arm member 20 to the cross-shaft 12. A plurality of scraper blades 10 may be mounted on the cross-shaft 12 adjacent to one another.

The scraper blade 10 also includes a scraping member 50 which is attached to the upper end portion 22 of the arm member 20. The scraping member 50 includes a front surface 52 having an upper surface portion 55 and a lower surface portion 56. The front surface 52 extends between an upper scraping edge 54 of the upper surface portion 55 and a lower edge of the lower surface portion 56. The front surface 52 faces the oncoming conveyor belt 16 to which material is adhered. As best shown in FIG. 1, the front surface 52 defines an arcuate wall 53 which is in the general shape of a parabola, however, the wall 53 may be circular, generally V-shaped or other configurations as desired. The upper surface portion 55 which extends from the scraping edge 54 is shown as being slightly curved, but may also be planar. The front surface 52 extends transversely, as shown in FIG. 2, between a left edge 58 and a right edge 60. The front surface 52 forms a generally arcuate chamber 61 defined by the wall 53. The chamber 61 has an inlet end at the scraping edge 54 adapted to receive material removed from the belt 16 and an outlet end at the lower surface portion 56 adapted to discharge the removed material from the chamber 61. The scraping member 50 also includes a rear surface 62 spaced apart from and opposed to the front surface 52. A generally planar upper surface 64 extends between the scraping edge 54 and the rear surface 62. The scraping edge 54 and the upper surface 64 are adapted to engage the surface 14 of the conveyor belt 16. Although the upper surface 64 is shown in FIG. 1 as generally horizontal and parallel to the surface 14 of the belt 16 when the scraper blade 10 is in its natural orientation, the upper surface 64 may be orientated in other positions as may be deemed desirable. For example, the upper surface 64 may extend from the scraping edge 54 upwardly or downwardly to the rear surface 62 at an angle to the horizontal.

As shown in FIG. 1, the upper surface portion 55, which adjoins the scraping edge 54, forms an oblique scraping angle with the surface 14 of the conveyor belt 16 providing all of the advantages previously discussed for operation in the peeling mode. The scraping member 50 is resilient and is preferably made of an elastomeric material such as urethane. It is preferred that the aperture 30 in the arm 20 be located as shown in FIG. 1 entirely to the front side of a line extending between the scraping edge 54 and the lower rear edge 25 of the base portion 24 of the arm 22.

The scraper blade 10 also includes a restraining member 70. The restraining member 70 shown in FIGS. 1 and 2 is in the form of a rib having a left side surface 72, a right side surface 74, and an outer surface 76 extending therebetween. The restraining member 70 is attached at its upper end to the upper surface portion 55 of the front surface 52 adjacent the scraping edge 54 at the inlet end of the chamber 61 and extends downwardly along the lower surface portion 56 of the front surface 52 and is attached at its lower end to the lower surface portion 56 of the front surface 52 adjacent the outlet end of the chamber 61. The restraining member 70 prevents separation of the inlet end from the outlet end beyond a predetermined distance which is the distance between the ends when the blade is not engaged against the belt. This effectively controls vibration of the scraper blade during operation. As best shown in FIG. 1, the outer surface 76 of the restraining member 70 extends substantially between the scraping edge 54 and the arm member 20 along a path which is slightly curved but which may be substantially linear. The outer surface 76 of the restraining member 70 preferably forms a right angle or an acute cleaning angle with the surface 14 of the belt 16.

The restraining member 70 is preferably made of an elastomeric material such as urethane. The restraining member 70 must be able to resist any substantial elongation under tensile working loads. The scraper blade 10 may include a plurality of restraining members as illustrated in FIG. 5. Although the restraining member 70 is shown as being external to the scraping member 50, the restraining member may comprise a rigid member such as a plate (not shown) which is embedded in the scraping member 50 and which extends from adjacent the scraping edge 54 to the lower surface portion 56.

In operation, the scraping edge 54 and the upper surface 64 of the scraper blade 10 illustrated in FIGS. 1–3 are pressed into scraping engagement with the surface 14 of the conveyor belt 16. If the upper surface 64 of the blade 10 is formed at an angle extending upwardly from the scraping edge 54, rather than extending horizontally and parallel to the belt 16 as shown in FIG. 1, the arm member 20 will flex as the blade 10 is pressed into engagement with the belt 16 allowing the upper surface 64 to rotate to a position where the upper surface 64 is parallel to and in engagement with the belt 16. If the upper surface 64 is formed at an angle extending downwardly from the scraping edge 54, only the scraping edge 54 and a portion of the upper surface 64 adjacent to the scraping edge 54 may be in engagement with the belt 16. As the belt 16 drags across the scraping edge 54, the scraping member 50 and arm member 20 will resiliently pivot about an axis 80 which extends transversely through the lower base portion 24 of the arm member 20. It is preferred that the scraping edge 54 be located behind the axis 80 such that a line extending through the scraping edge 54 and the axis 80 will form an acute angle with the surface 14 of the conveyor belt 16.

During operation the scraping edge 54 and inlet end of the chamber 61 are prevented by the restraining member 70 from separating from the lower surface portion 56 and outlet end of the chamber 61 beyond a predetermined distance. The restraining member 70 substantially prevents movement of the scraping edge 54 and inlet end of the chamber 61 in either a direction away from or a direction towards the lower surface portion 56 and outlet end of the chamber 61 and thereby substantially prevents movement of the scraping edge 54 with respect to the wall 53 and maintains the profile of the wall 53 substantially uniform during use. The restraining member 70 thereby controls the amplitude of vibration of the scraping edge 54 of the scraper blade 10. Although vibration may be completely eliminated, some amplitude of vibration may be desirable in certain situations such as where the materials being conveyed tend to stick to the blade. In such a situation some amplitude of vibration may be desirable to shed the blade of these sticky materials. This can be accomplished by varying the configuration and design of the restraining member 70 to allow limited separation of the scraping edge 54 from the lower surface portion 56 during use beyond the predetermined distance.

FIGS. 4 and 5 show a scraper blade 90 which is a modified embodiment of the scraper blade 10. The scraper blade 90 includes a mounting base 40 and an arm member 20 as in the scraper blade 10 illustrated in FIGS. 1-3. The scraper blade 90 includes a scraping member 92 which is similar to the scraping member 50 except that the scraping member 92, as shown in FIG. 4, includes a scraping element 94 located in an upper portion of the front surface 93. The scraping element 94 forms a scraping edge 96. The scraping element 94 may alternatively be attached to the upper surface 97 of the scraping member 92. The scraping element 94 is preferably made of a material which is harder than that of the scraping member 92. The scraping element 94 is preferably made from a hard metal such as tungsten carbide. The scraping element 94 provides increased abrasion resistance to reduce wear of the scraper blade from scraping engagement with the belt 16.

The scraper blade 90 includes a pair of restraining members 98 and an arcuate chamber 99. Only one restraining member 98, or more than two restraining members 98, may be used if desired. Each restraining member 98 is an elongate member having an upper end 100 and a lower end 102. The upper end 100 is attached to the upper surface portion 101 of the front surface 93 of the scraping member 92, or to the scraping element 94, adjacent the scraping edge 96 at the inlet end of the chamber 99. The lower end 102 is attached to the outlet end of the chamber 99 at the lower surface portion 103 of the front surface 93 and to the arm member 20. As best shown in FIG. 4, an aperture 104 is formed between the restraining members 98 and the center portion of the front surface 93. The restraining members 98 may be formed from a web of elastomeric material such as urethane, or may be made from other materials such as steel chain or cable. As with the restraining member 70, the restraining members 98 must be able to resist any substantial elongation under tensile working loads.

The scraper blade 90 operates in substantially the same manner as the scraper blade 10. The scraping edge 96 and inlet end of the chamber 99 is prevented by the restraining members 98 from separating from the lower surface portion 103 and outlet end of the chamber 99 beyond a predetermined distance. The restraining members 98 thereby control the amplitude of vibration of the scraping edge 96 of the scraper blade 90.

FIGS. 6–8 illustrate a modified embodiment of the scraper blade of the present invention generally designated with the numeral 110. The scraper blade 110 includes a resilient arm member 112 having a top portion 114 and a bottom portion 116. The bottom portion 116 of the arm member 112 includes a front wall 118 and a spaced apart and opposing rear wall 120. The rear wall 120 is relatively strong in compression, while the front wall 118 is relatively weak in compression compared to the rear wall 120. An aperture 122 extends transversely through the bottom portion 116 of the arm member 112 between the front wall 118 and the rear wall 120 from a first side wall surface 124 to a second side wall surface 126. The bottom portion 116 of the arm member 112 is constructed similarly to the arm member 20 and as generally described in U.S. Pat. No. 5,310,042. Alternatively, the aperture 122 may be eliminated such that the bottom portion 116 is solid. The bottom portion 116 of the arm member 112 is resilient and is preferably made of an elastomeric material such as urethane.

The top portion 114 of the arm member 112 includes a front wall 130 which functions as a restraining member. The front wall 130 includes a bottom end 131 which is attached to and integrally formed with the front wall 118 of the bottom portion 116 and extends upwardly therefrom to an upper edge 132 formed at a top end 133 of the front wall 130. The front wall 130 extends between a left edge 134 and a right edge 136. The left edge 134 extends upwardly from the first side wall surface 124 of the bottom portion 116 to the upper edge 132, and the right edge 136 extends upwardly from the second side wall surface 126 of the bottom portion 116 to the upper edge 132. The left edge 134 and the right edge 136 converge towards one another as they extend from the side wall surfaces 124 and 126 towards the upper edge 132. The front wall 130 is shown as terminating in the generally linear upper edge 132 such that the front wall 130 is in the general shape of a truncated triangle as shown in FIG. 7. The front wall 130, however, may also be formed in the general shape of a triangle wherein the left edge 134 and right edge 136 of the front wall 130 converge at a point, or in other shapes as desired.

The top portion 114 of the arm member 112 also includes a rear wall 140 which functions as a support member. The rear wall 140 extends upwardly from the rear wall 120 of the bottom portion 116 to a top end 142. The rear wall 120 may be spaced apart from, or integrally formed with, the front wall 130. As best shown in FIG. 8, the rear wall 140 is formed in the general shape of a truncated triangle having a left edge 144 which extends between the second side wall surface 126 of the bottom portion 116 and the top end 142 and a right edge 146 which extends upwardly between the first side wall surface 124 of the bottom portion 116 and the top end 142. The top portion 114 also includes a first side wall surface 150 which extends between the right edge 146 of the rear wall 140 and the left edge 134 of the front wall 130. The first side wall surface 150 extends upwardly from the first side wall surface 124 of the bottom portion 116 to an upper edge 152 which extends generally linearly between the upper edge 132 of the front wall 130 and the top end 142 of the rear wall 140. The top portion 114 of the arm member 112 also includes a second side wall surface 154 which extends upwardly from the second side wall surface 126 of the bottom portion 116 to an upper edge 156 and which extends between the left edge 144 of the rear wall 140 and the right edge 136 of the front wall 130. As shown in FIG. 6, the top portion 114 may, if desired, include an aperture 158 as shown in dashed lines which extends through the top portion 114 such that the front wall 130 and the rear wall 140 are spaced apart from one another. The top portion 114 of the arm member 112 is preferably constructed of a resilient elastomeric material such as urethane.

The scraper blade 110 includes a mounting base 164 which is attached to the lower end of the bottom portion 116 of the arm member 112. The mounting base 164 is removably mountable to the cross shaft 12 and is preferably slidable along the cross shaft 12, but cannot rotate relative to the cross shaft 12 about the longitudinal axis 13. The arm member 112 may be mounted to the cross shaft 12 with various types of mounting arrangements as desired.

The scraper blade 110 also includes a scraping member 170 which is integrally attached to the top portion 114 of the arm member 112. The scraping member 170 includes a front surface 172. The front surface 172 is generally planar and extends between a linear scraping edge 174 and a rear edge 176 and between a left edge 178 and a right edge 180. The front surface 172 faces the oncoming conveyor belt 16 to which material is adhered. The scraping member 170 also includes a generally planar upper surface 182 which extends between the scraping edge 174 and a rear edge 184 and between a left edge 186 and a right edge 188. The scraping edge 174 and the upper surface 182 are adapted to slidably engage the surface 14 of the conveyor belt 16. The scraping member 170 also includes a rear surface 190 which extends between the rear edge 184 of the upper surface 182 and the rear edge 176 of the front surface 172 and between a left chamfered edge 192 and a right chamfered edge 194. The scraping member 170 also includes a generally triangular left wall surface 196 which extends between the left edge 186 of the upper surface 182, the left edge 178 of the front surface 172, and the right edge 194 of the rear surface 190. A generally triangular right wall surface 198 extends between the right edge 188 of the upper surface 182, the right edge 180 of the front surface 172, and the left edge 192 of the rear surface 190.

The front surface 172 is disposed at an acute angle relative to the upper surface 182 and is preferably disposed at an angle of approximately sixty degrees relative to the upper surface 182. The front surface 172 is designed to be disposed at an obtuse angle to the surface 14 of the conveyor belt 16. The front surface 172 may be generally planar or may be curved between the scraping edge 174 and the rear edge 176. The rear surface 190 is shown as being curved but may be planar. As best shown in FIG. 6, the scraping member 170 is generally triangular in cross section. The scraping member 170 may be made of various materials as desired, such as urethane. The scraping member 170 may include a metallic scraping element such as the scraping element 94 shown in FIG. 4. The scraping member 170 may be formed entirely or in part with a low-friction material such as nylon, ultra high molecular weight polyethylene, polytetrafluoroethylene (PTFE), silicon or a low-friction material sold under the name XYLETHON by DuraWear Corporation of Birmingham, Ala. The low-friction material preferably has a sliding coefficient of friction equal to or less than 0.7 with rubber and in the preferred embodiment equal to or less than 0.6 with rubber. The low-friction material may be provided in the form of an insert 200 molded integrally with, or mechanically fastened to, the scraping member 170 or arm member 112. As shown in FIG. 6, the insert 200 may be generally triangular extending between a rear edge 202, the upper surface 182 and the front surface 180, forming a portion of the upper surface 182, the front surface 180 and the scraping edge 174. The insert 200 may also be formed in other shapes as desired and may comprise a layer having a desired thickness which forms the upper surface 182, or a portion thereof, and the scraping edge 174. The low-friction material reduces friction and the amount of drag force created between the upper surface 182 and the surface 14 of the conveyor belt 16.

The top end 133 of the front wall 130 of the top portion 114 of the arm member 112 is attached to the front surface 172 of the scraping member 170 such that the top end 133 and the upper edge 132 of the front wall 130 are located at the scraping edge 170, or closely adjacent thereto as shown in FIG. 6. The bottom end 131 of the front wall 130 is attached to the front wall 118 of the bottom portion 116 of the arm member 112 and thereby to the mounting base 164. The rear wall 140 of the top portion 114 is attached to the front surface 172 of the scraping member 170 preferably at the rear edge 176 of the front surface 172.

In operation, the scraping edge 174 and upper surface 182 of the scraping member 170 are pressed into scraping engagement with the surface 14 of the conveyor belt 16. This requires a counterclockwise rotation from the position illustrated in FIG. 6. The scraping edge 174 and the front surface 172 remove adherent material from the surface 14 of the conveyor belt 16. The removed adherent material travels along the front surface 172 and is discharged at the rear edge 176 of the front surface 172. The front surface 172 is located at an approximate angle of 60° relative to the upper surface 182. Material which is removed from the conveyor belt 16 therefore changes its direction of travel by approximately 60° as it changes from its direction of travel along the belt 16 to its direction of travel along the front surface 172. The small change in the angle of travel of the removed material provided by the scraping member 170 results in a relatively small force being applied to the scraping member 170 by the adherent material which engages the front surface 172. This force attempts to separate the scraping member 170 from the conveyor belt 16. A small or reduced separating force as provided by the scraping member 170 therefore improves cleaning operations. The front wall 130 as shown in FIG. 7 includes a small profile, especially at the upper edge 132, which faces the oncoming adherent material and thereby provides a small area for the adherent material to come into contact with the top portion 114 of the arm member 112.

The front wall 130 functions as a restraining member and substantially prevents movement of the scraping edge 174 towards or away from the bottom portion 118 of the arm 112. The restraining member 130 of the top portion 114 thereby controls the amplitude of vibration of the scraping edge 174 of the scraper blade 110. As previously stated, some vibration may be desirable. This can be accomplished by varying the design of the top portion 114 and its attachment to the scraping member 170 to allow some pivotal movement of the scraping edge 174.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A conveyor belt scraper blade adapted for use in cleaning the surface of a conveyor belt, said scraper blade including:

an arm member having a support member and a restraining member, said restraining member including a top end and a bottom end, and a scraping member attached to said arm member, said scraping member including a front surface extending between a scraping edge and a rear edge, and an upper surface extending from said scraping edge, said top end of said restraining member being attached to said front surface of said scraping member at a location positioned more closely adjacent to said scraping edge than to said rear edge, said restraining member adapted to control vibration of said scraper blade during use.

2. The conveyor belt scraper blade of claim 1 wherein said arm includes a bottom portion and a top portion, said top portion of said arm extending between said support member and said restraining member, said support member and said restraining member extending between said bottom portion of said arm and said scraping member.

3. The conveyor belt scraper blade of claim 2 wherein said support member is attached to said front surface adjacent said rear edge of said front surface.

4. The conveyor belt scraper blade of claim 2 wherein said restraining member comprises a front wall of said top portion of said arm.

5. The conveyor belt scraper blade of claim 4 wherein said front wall is generally triangular.

6. The conveyor belt scraper blade of claim 2 wherein said restraining member is integrally formed with said support member.

7. The conveyor belt scraper blade of claim 1 wherein said front surface of said scraping member is disposed at an acute angle relative to said upper surface of said scraping member.

8. The conveyor belt scraper blade of claim 7 wherein said front surface is generally planar.

9. The conveyor belt scraper blade of claim 7 wherein said front surface of said scraping member is disposed at an angle of approximately 60° relative to said upper surface of said scraping member.

10. The conveyor belt scraper blade of claim 1 wherein said scraping member includes an insert.

11. The conveyor belt scraper blade of claim 10 wherein said insert comprises a low-friction material.

12. The conveyor belt scraper blade of claim 1 wherein said scraping member is integrally formed with said arm member.

13. The conveyor belt scraper blade of claim 1 including a mounting base attached to said arm member.

14. A conveyor belt scraper blade adapted for cleaning the surface of a conveyor belt, said scraper blade including:

a scraping member including a front surface extending between a scraping edge and a rear edge and an upper surface extending from said scraping edge;

a resilient support member attached to said scraping member adapted to support said scraping member in contact with the conveyor belt, and a restraining member attached to said front surface of said scraping member at a position located more closely adjacent to said scraping edge than to said rear edge, said restraining member adapted to control vibration of said scraper blade during use.

15. The conveyor belt scraper blade of claim 14 wherein said scraping member is formed, at least in part, of a material having a coefficient of sliding friction equal to or less than approximately 0.7 with rubber.

16. The conveyor belt scraper blade of claim 14 wherein said support member and said restraining member form an arm member.

17. The conveyor belt scraper blade of claim 14 wherein said upper surface is disposed at an acute angle to said front surface of said scraping member.

18. The conveyor belt scraper blade of claim 14 wherein said restraining member is formed with an elastomeric material.

* * * * *